US007721867B2

(12) United States Patent
Nakamura

(10) Patent No.: US 7,721,867 B2
(45) Date of Patent: May 25, 2010

(54) ROTATION OUTPUT DEVICE

(75) Inventor: Daijiro Nakamura, Hyogo (JP)

(73) Assignee: Techtronic Power Tools Technology Limited, Tortola (GB)

( * ) Notice: Subject to any disclaimer, the term of this patent is extended or adjusted under 35 U.S.C. 154(b) by 603 days.

(21) Appl. No.: 10/598,457

(22) PCT Filed: Mar. 4, 2005

(86) PCT No.: PCT/JP2005/003724

§ 371 (c)(1),
(2), (4) Date: Dec. 19, 2006

(87) PCT Pub. No.: WO2005/085677

PCT Pub. Date: Sep. 15, 2005

(65) Prior Publication Data

US 2007/0205077 A1 Sep. 6, 2007

(30) Foreign Application Priority Data

Mar. 5, 2004 (JP) ............................ 2004-061933

(51) Int. Cl.
*F16D 67/00* (2006.01)

(52) U.S. Cl. .................................................. 192/223.1

(58) Field of Classification Search ............. 192/223.1, 192/15, 16
See application file for complete search history.

(56) References Cited

U.S. PATENT DOCUMENTS

| | | | | |
|---|---|---|---|---|
| 4,804,048 A * | 2/1989 | Porth, Jr. | 173/47 |
| 5,624,013 A | 4/1997 | Tsai | |
| 6,010,426 A * | 1/2000 | Nakamura | 477/22 |
| 6,068,097 A | 5/2000 | Kurita | |
| 7,063,201 B2 * | 6/2006 | Nakamura et al. | 192/223.1 |
| 2002/0130007 A1 * | 9/2002 | Nakamura et al. | 192/38 |

FOREIGN PATENT DOCUMENTS

| | | |
|---|---|---|
| EP | 0909614 | 4/1999 |
| JP | 1-266359 | 10/1989 |

(Continued)

OTHER PUBLICATIONS

English Language Abstract of JP 11-182590.

(Continued)

*Primary Examiner*—Rodney H Bonck
*Assistant Examiner*—Justin Holmes
(74) *Attorney, Agent, or Firm*—Michael Best & Friedrich LLP

(57) ABSTRACT

The present invention has an object of providing a rotation output device, including a lock mechanism employing a movable lock member so as to define the lock position, which is capable of, when the operator operates an output shaft to pivot, preventing the movable lock member from being concomitantly rotated with the output shaft and thus providing a locking function with certainty. The rotation output device according to the present invention includes, between the lock gears 35 and the lock ring 33, a carry plate 37 for retaining the positions of the lock gears 35 in the rotation direction when receiving a rotation force from the center ring 32. Thus, the lock ring 33 which is rotational-fixed is used as a member for preventing the concomitant rotation of the lock gears 35.

6 Claims, 11 Drawing Sheets

FOREIGN PATENT DOCUMENTS

| | | |
|---|---|---|
| JP | 3-251374 | 11/1991 |
| JP | 6-028404 | 4/1994 |
| JP | 6-053350 | 7/1994 |
| JP | 11-182590 | 7/1999 |
| JP | 2002-337062 | 11/2002 |
| WO | 0178948 | 10/2001 |

OTHER PUBLICATIONS

English Language Abstract of JP 3-251374.
English Language Abstract of JP 2002-337062.

* cited by examiner

ROTATION OUTPUT DEVICE

TECHNICAL FIELD

The present invention relates to a rotation output device usable in, for example, an electric tool such as an electric driver or the like and capable of locking an output shaft of a motor when the motor is controlled to stop and thus the output shaft is stopped.

BACKGROUND ART

Conventionally, electric tools having a function of automatically locking an output shaft (spindle) when the motor is controlled to stop as described above are known (for example, see Patent Document 1 mentioned below).

The automatic lock mechanism of the electric tool described in Patent Document 1 is structured as follows. A projection formed on a circumference of an input shaft for inputting a rotation driving force and a projection formed on a circumference of an output shaft for outputting a rotation driving force are coupled with each other with a predetermined play angle. A pair of rollers are located between these projections within the play angle. One of the rollers is operable in correspondence with a rotation in a forward direction, and the other roller is operable in correspondence with a rotation in a reverse direction. On the side of the output shaft, a pair of wedge effect slopes are provided for providing a locking function with a wedge effect using one roller in the case of a rotation in the forward direction and the other roller in the case of a rotation in the reverse rotation. Thus, the lock mechanism is realized.

This electric tool operates as follows. The motor is controlled to stop, and the input shaft stops rotating. In this state, the operator pivots the output shaft by the play angle. Then, one of the pair of rollers bites into one of the wedge effect slopes corresponding to the rotation direction. Thus, the output shaft is locked by the wedge effect.

Such a lock mechanism using the rollers requires the rollers to rotate freely. Therefore, it is difficult to define the position at which each roller bites into the wedge effect slope. As a result, a problem may occur that the roller does not bite or bites insufficiently.

Instead of the rollers, a lock mechanism disclosed in Patent Document 2 is employable.

The lock mechanism described in Patent Document 2 operates as follows. A movable lock member (referred to as a "brake shoe" in Patent Document 2) movable in a radial direction is provided between an inner circumferential surface of a fixed ring which is fixed to a casing and an outer circumferential surface of a lock ring which is fixed to an output shaft. The movable lock member is pressed toward the fixed ring using a cam face formed on the outer circumferential surface of the lock ring. Thus, the output shaft is locked.

With a lock mechanism formed by such a movable lock member, when the relative rotation angle between the lock ring and the movable lock member is changed (when the relative rotation direction is changed), the movable lock member is pressed toward the fixed ring with certainty by the cam face. Therefore, the locking position is defined, which solves the above-mentioned problem of the lock mechanism using the rollers.

Patent document 1: Japanese Publication for Opposition No. 6-53350

Patent document 2: Japanese Laid-Open Patent Publication No. 2002-337062

DISCLOSURE OF INVENTION

Problems to be Solved by the Invention

However, the lock mechanism using the movable lock member described in Patent Document 2 has the following problem.

In order to lock the movable lock member, this lock mechanism requires the relative rotation direction between the lock ring and the movable lock member to be changed as described above. When such a change does not occur, no locking function is provided.

When the operator stops the rotation of the motor and rotates the output shaft in the same direction as the rotation driving direction, there is a play angle between the input shaft and the output shaft. The relative rotation direction between the lock ring fixed to the output shaft and the movable lock member is changed by an angle corresponding to the play angle. Thus, a locking function is provided.

By contrast, when the operator stops the rotation of the motor and rotates the output shaft in the opposite driving direction, there is no play angle between the input shaft and the output shaft. Therefore, when the operator pivots the output shaft, the input shaft and elements related thereto pivot and the movable lock member also pivots. Even if the output shaft is pivoted much, the relative rotation direction between the lock ring and the movable lock member is not changed, and the movable lock member rotates concomitantly with the input shaft and elements related thereto.

When the movable lock member concomitantly rotates, the locking function is not provided and the lock mechanism does not act as intended. In addition, because the locking function is not provided, the operator needs to pivot the output shaft having a load imposed by the stoppage of the motor for an extended period of time. This lowers the operability.

This problem also occurs when the output shaft is first pivoted in the same direction as the driving direction to provide a locking function and then is pivoted in the opposite direction.

The present invention has an object of providing a rotation output device, including a lock mechanism using a movable lock member for defining a locking position, which is capable of, when the operator operates an output shaft to pivot, providing a locking function with certainty by preventing the movable lock member from concomitantly rotating with the output shaft.

Means for Solving the Problems

A rotation output device according to the present invention comprises an output conveyance mechanism including a rotation driving member for outputting a rotation driving force and a rotation output member for outputting a rotation force in response to the driving of the rotation driving member, which are coaxially connected to each other so as to convey the rotation force, with a predetermined play angle to which the rotation force is not conveyed being formed in a relative rotation direction; and a lock mechanism including a movable lock member for locking a rotation conveyed from the rotation output member by being pressed toward a fixing member by the rotation output member, wherein the rotation output member and the fixing member located on an outer circumferential surface of the rotation output member and rotational-fixed are provided to face each other while being separated by a predetermined distance in a radial direction; a lock operation member operable to press the movable lock member toward the fixing member by the rotation conveyed from the rotation output member; and a release member capable of releasing the pressed state of the movable lock member by the rotation conveyed from the rotation driving member and thus capable of releasing the locked state. Retaining means is provided, between the movable lock member and the fixing member, for retaining the position of the movable lock member in the rotation direction when receiving the rotation from the rotation output member.

Namely, the retaining means, for retaining the position of the movable lock member in the rotation direction when receiving the rotation from the rotation output member, is provided between the movable lock member and the fixing member. Thus, the fixing member which is rotational-fixed is used as a member for preventing a concomitant rotation of the movable lock member.

According to the above-described structure, the fixing member which is rotational-fixed is used as a member for preventing a concomitant rotation of the movable lock member. Therefore, the position of the movable lock member in the rotation direction is constantly retained under the influence of the fixed state of the fixing member by the retaining means. Namely, the position of the movable lock member in the rotation direction is retained with certainty regardless of the pivoting direction of the output shaft.

In one embodiment of the present invention, the retaining means is formed of a contact member integrally rotatable with the movable lock member and partially contacting the fixing member.

Namely, the contact member integrally rotatable with the movable lock member is provided on the side of the movable lock member, among the movable lock member and the fixing member, and the contact member is used as the retaining means.

According to the above-described structure, the relative rotation direction between the contact member as the retaining means and the movable lock member is not changed in the state of being driven to rotate by the motor or the like. Rather, the relative rotation direction between the contact member and the fixing member is changed. By causing the relative rotation direction between the contact member and the fixing member to be changed, the undesirable possibility that the routine operations for locking or releasing the movable lock member are disturbed by the influence of such a change with respect to the contact member as the retaining means can be eliminated.

In one embodiment of the present invention, a plurality of the movable lock members are provided, and the plurality of movable lock members are integrally rotatable with one another by one contact member.

According to the above-described structure, the lock torque can be increased by providing a plurality of movable lock members. Since the plurality of movable lock members are integrally rotatable with one another by one contact member, the positions of the plurality of movable lock members in the rotation direction are retained in the state of being matched with one another.

In one embodiment of the present invention, sliding resistance increasing means for increasing a sliding resistance is provided at a position where the contact member contacts the fixing member.

According to the above-described structure, the contact member contacts the fixing member while having a high sliding resistance. Therefore, the contact member is easily influenced by the rotational-fixed state of the fixing member. As a result, the position of the contact member in the rotation direction is retained with higher certainty, and the contact member retains the position of the movable lock member in the rotation direction with higher certainty.

In one embodiment of the present invention, the sliding resistance increasing means is formed of an elastic member.

According to the above-described structure, the elastic member acts as sliding resistance means. Therefore, the contact member can be in constant contact with the fixing member. Namely, since the offset of the relative positions of the contact member and the fixing member in the axial direction is absorbed by the elastic member, the contact member can be in constant contact with the fixing member.

As a result, the contact member can constantly retain the position of the movable lock member in the rotation direction with higher certainty.

The rotation output device according to the present invention can be provided in an output system of an electric tool, and is also applicable to an apparatus requiring rotation output.

EFFECT OF THE INVENTION

According to the present invention, retaining means for retaining the position of the movable lock member in the rotation direction when receiving the rotation from the rotation output member is provided between the movable lock member and the fixing member. Thus, the fixing member which is rotational-fixed is used as a member for preventing a concomitant rotation of the movable lock member. Therefore, the position of the movable lock member in the rotation direction is retained with certainty regardless of the pivoting direction of the output shaft.

Accordingly, a rotation output device, including a lock mechanism employing a movable lock member, which is capable of, when the operator operates an output shaft to pivot, preventing the movable lock member from being concomitantly rotated with the output shaft and thus providing a locking function with certainty can be provided.

DESCRIPTION OF REFERENCE NUMERALS

31 . . . input carrier (rotation driving member)

31*d* . . . release guide hole (release member)

32 . . . center ring (rotation output member)
32*b* . . . lock guide cam face (lock operation member)
33 . . . lock ring (fixing member)
35 . . . lock gear (movable lock member)
37 . . . carry plate (retaining member)

BEST MODE FOR CARRYING OUT THE INVENTION

One embodiment of the present invention will be described in detail with reference to the drawings.

Figure 1:
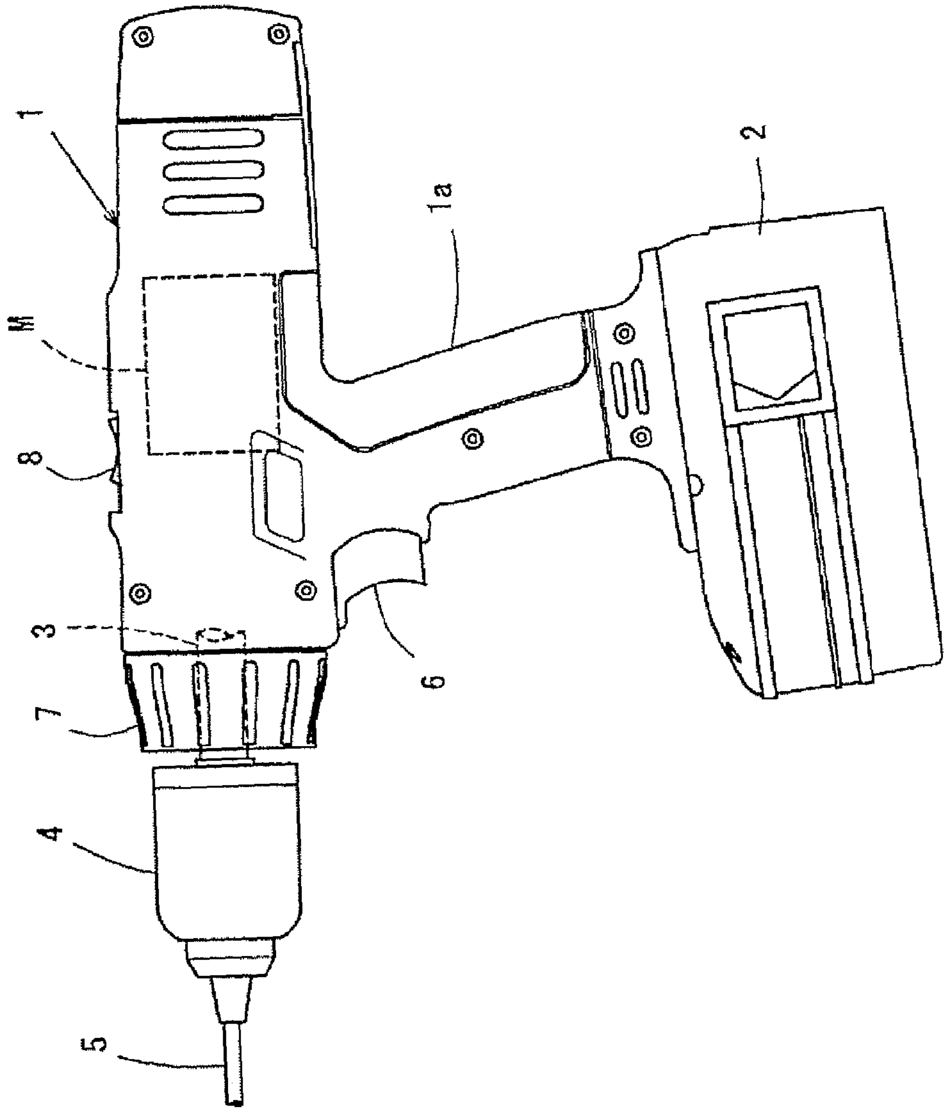
FIG. 1 is a side view of the entirety of an electric tool employing a rotation output device according to the present invention.

FIG. 1 shows an electric tool employing a rotation output device according to the present invention. As shown in FIG. 1, the electric tool includes a housing 1 having a handle 1*a* to be held by an operator when the operator uses the electric tool, a power source pack 2 provided below the housing 1, a spindle 3 provided forward to the housing 1, a chuck 4 attached to the spindle 3, and a drill bit 5 supported by the chuck 4.

The housing 1 accommodates a motor M selectably rotatable in a forward direction or a reverse direction and a rotation output device 10 (see FIG. 2) describe below. A rotation driving force of the motor M is conveyed to the spindle 3 via the rotation output device 10.

The housing 1 includes a switch handle 6 used for inputting a driving signal for the motor 2, a clutch handle 7 for adjusting a tightening torque of the spindle 3, and a gearshift switch 8 for shifting the rotation speed of the spindle 3.

This embodiment is described with a hand-held electric tool. The present invention is not limited to such a hand-held electric tool and is applicable to a general electric tool with a cord. The present invention is not limited to being used in an electric tool and is also applicable to a driver, grinder, router or the like. The present invention is not limited to being used in an appliance driven by electricity, and is applicable to a hydraulic appliance or the like.

Figure 2:
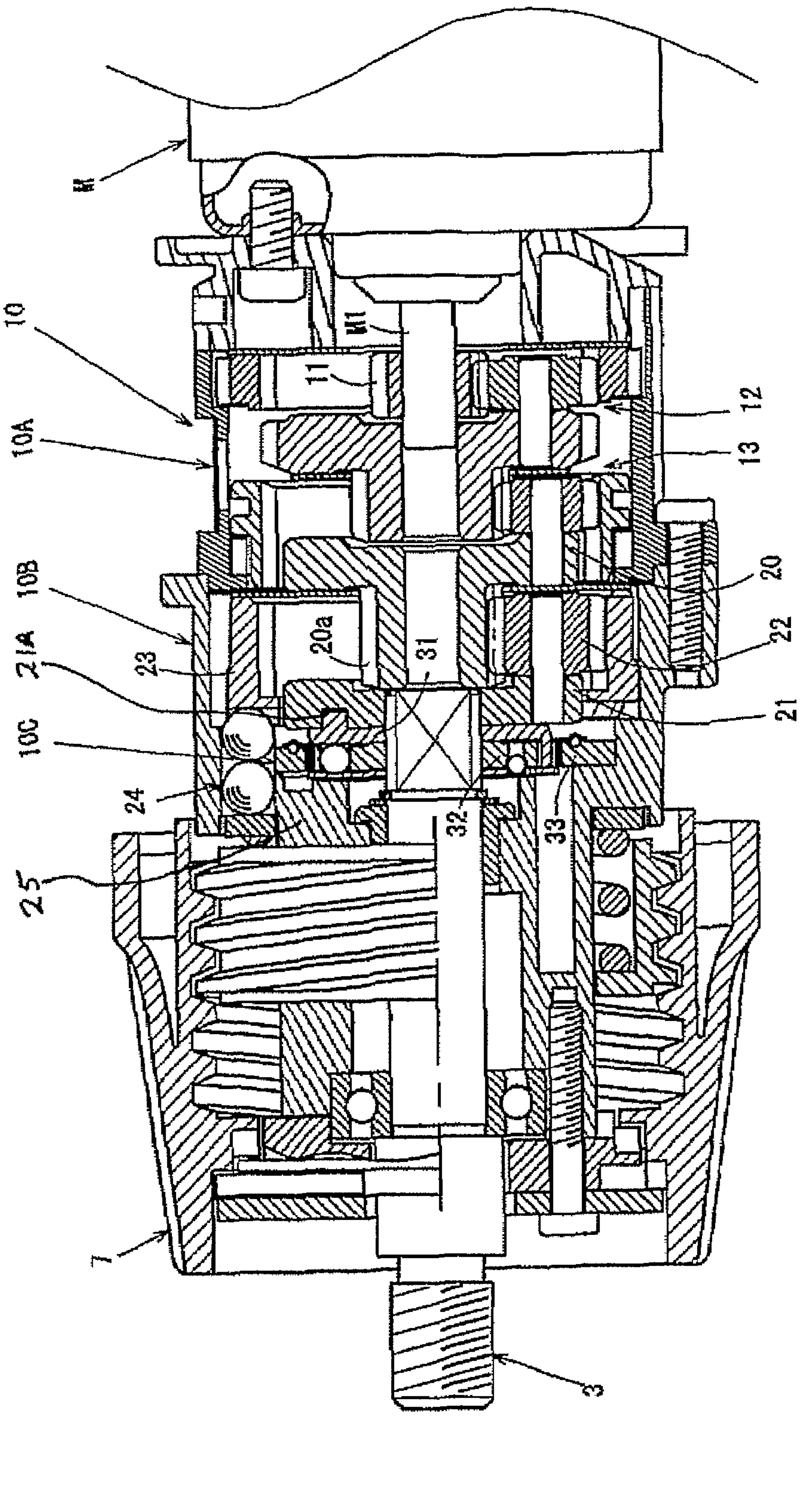
FIG. 2 is a cross-sectional view of the rotation output device.

Next, with reference to FIG. 2, the rotation output device 10 provided in the electric tool will be described. The rotation output device 10 roughly includes a gearshift mechanism section 10A for shifting the rotation speed of an output shaft M1 of the motor M, a torque limiter mechanism section 10B for adjusting the tightening torque of the spindle, and a lock mechanism section 10C for automatically locking or automatically releasing the spindle.

The gearshift mechanism section 10A includes a first planetary gear set 12 having a sun gear 11 fixed to the output shaft M1 of the motor, and a second planetary gear set 13 provided parallel to the above-mentioned gear set. The gear shifting is performed in accordance with whether the second planetary gear set 13 decelerates or not.

The specific gearshift mechanism is well known and will not be described here.

The torque limiter mechanism section 10B includes a sun gear 20*a* provided on a small-radius portion of an output carrier member 20 of the gearshift mechanism section 10A, a planetary gear 22 engageable with the sun gear 20*a* for outputting a rotation driving force to a spindle-side carrier member 21, an internal gear 23 engageable with the planetary gear 22 and pivotable, and a clutch mechanism 24 for providing a pressing force to the internal gear 23 and rotational-fixing the internal gear 23 when the rotation driving torque is equal to or less than a predetermined level. The torque limiter mechanism section 10B limits the conveyance of a tightening torque equal to or greater than a set value of torque in order to protect the tightening nut and the like.

The structure of the torque limiter mechanism section 10B is also well known and will not be specifically described here.

The lock mechanism section 10C mainly includes an input carrier 31 for receiving the rotation driving force from the spindle-side carrier member 21 of the torque limiter mechanism section 10B, a center ring 32 fixedly engageable with the spindle 3 for outputting a rotation driving force to the spindle 3, and a lock ring 33 located at an outer periphery of the lock mechanism section 10C for fixing the lock mechanism section 10C to a clutch casing 25. The lock mechanism section 10C automatically locks the spindle 3 in response to the rotation conveyed from the spindle 3, and automatically releases the spindle 3 in response to the rotation conveyed from the motor M.

Figure 3:
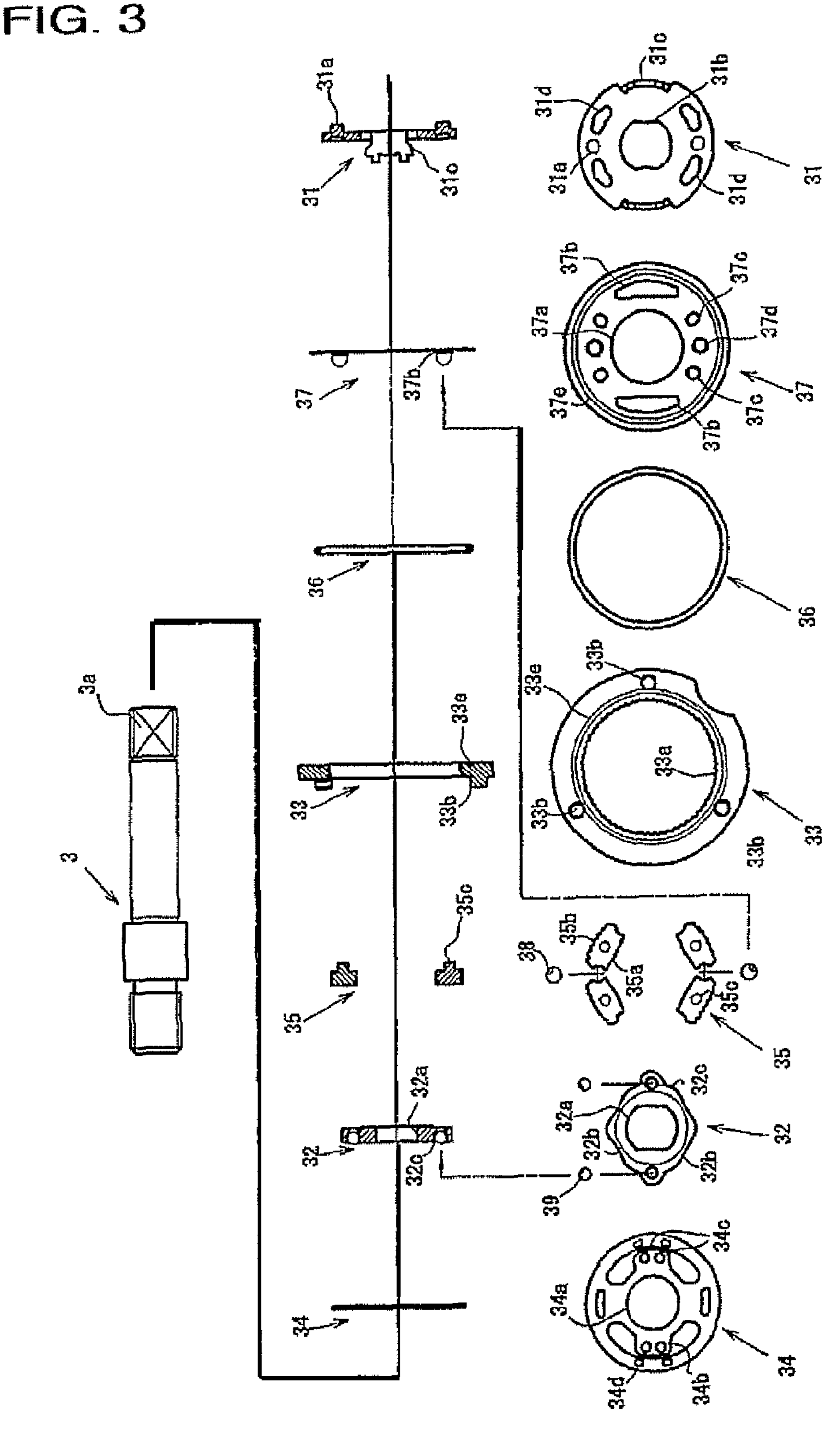
FIG. 3 is an exploded view showing elements of a lock mechanism section of the rotation output device together with a side view thereof.
Figure 4:
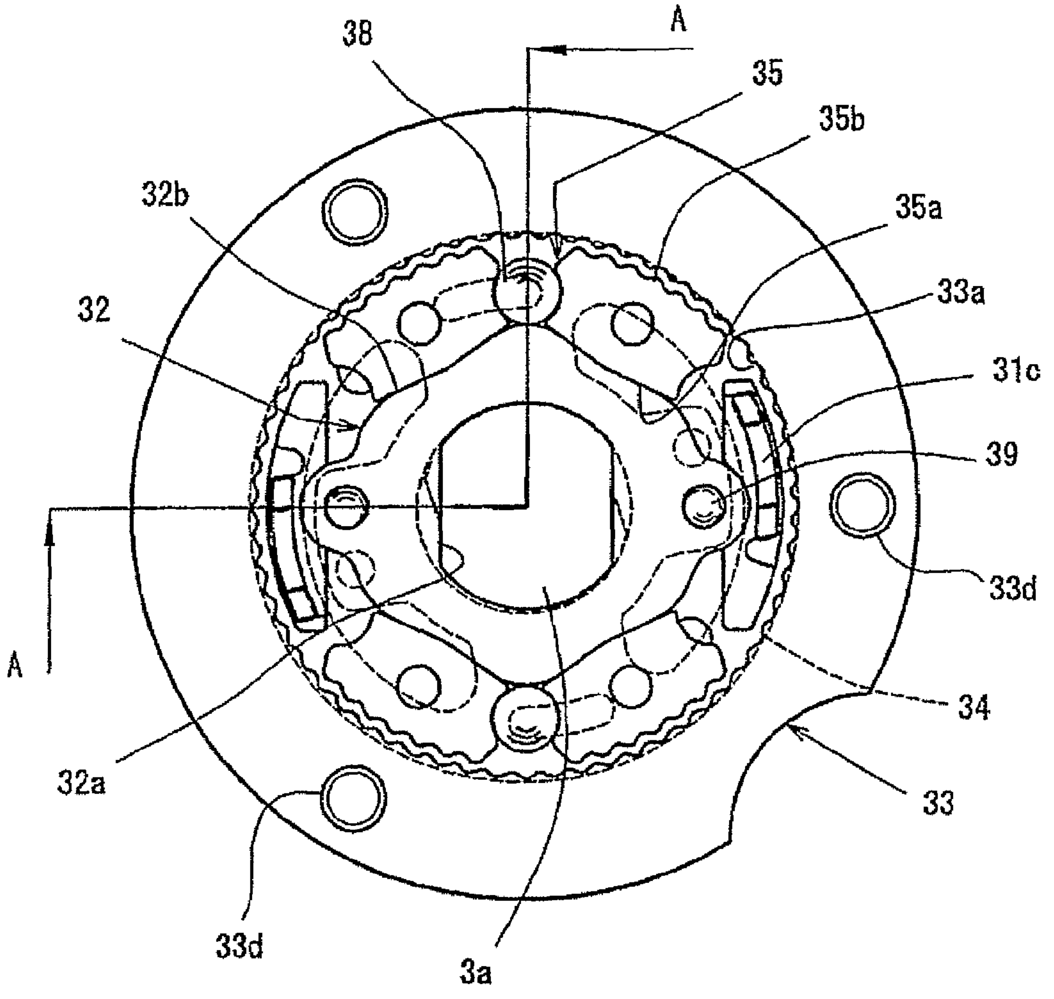
FIG. 4 is a front view of the lock mechanism section.
Figure 5:
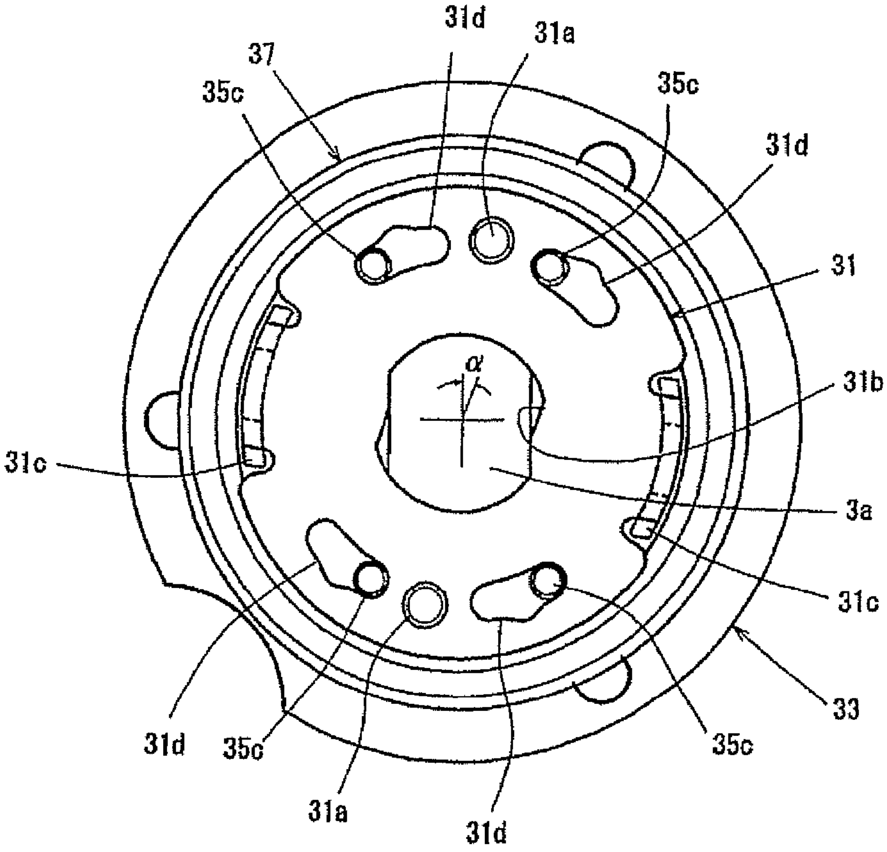
FIG. 5 is a rear view of the lock mechanism section.
Figure 6:
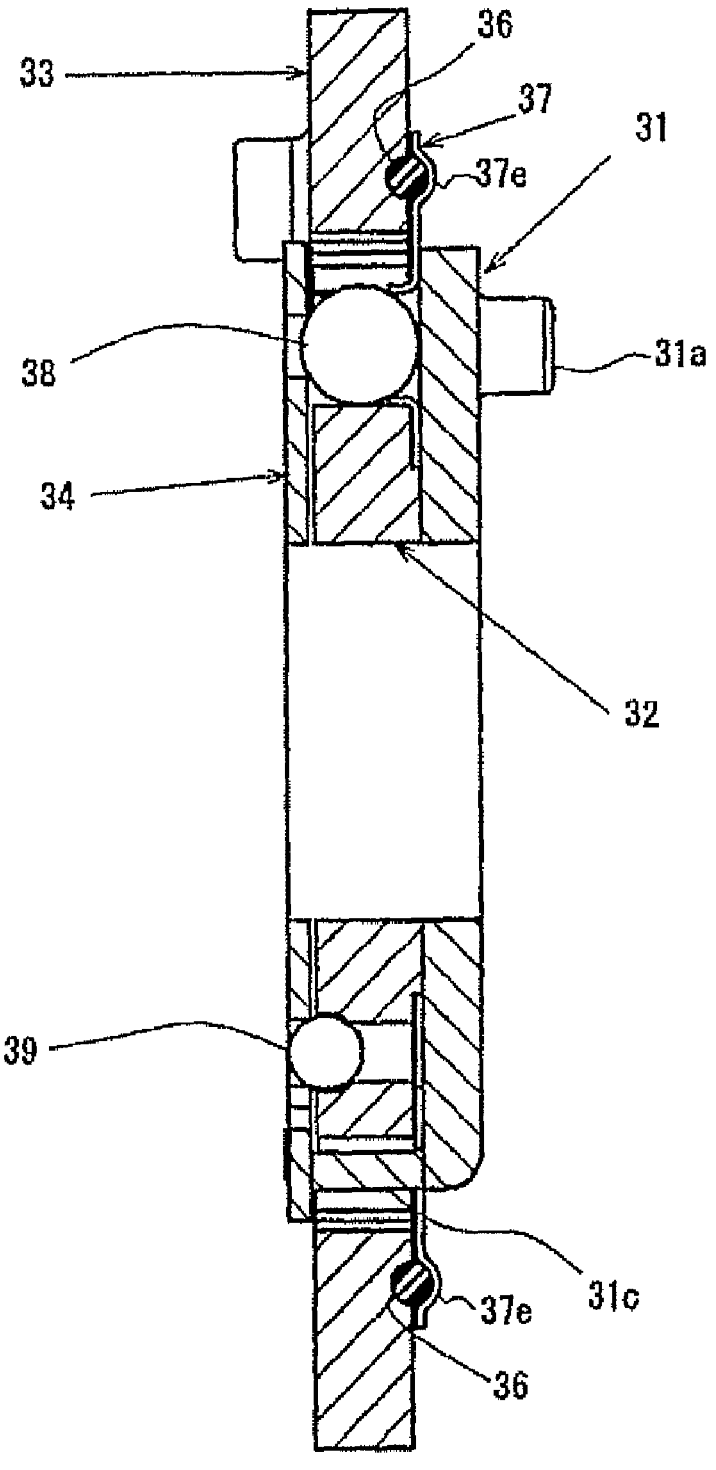
FIG. 6 is a cross-sectional view of the lock mechanism section taken along line A-A in FIG. 4.

A structure of the lock mechanism section 10C will be described in detail with reference to FIG. 3 through FIG. 6. FIG. 3 is an exploded view showing elements of the lock mechanism section together with a side view thereof. FIG. 4 is a front view of the lock mechanism section. FIG. 5 is a rear view of the lock mechanism section. FIG. 6 is a cross-sectional view of the lock mechanism section taken along line A-A in FIG. 4.

As shown in FIG. 3, the lock mechanism section 10C includes, from the side of the spindle 3, a click spring 34, the center ring 32, four lock gears 35, the lock ring 33, an O-ring 36, a carry plate 37, and an input carrier 31. The elements, except for the center ring 32 and the four lock gears 34, are ring-shaped and coaxially located.

The input carrier 31 includes projections 31*a* at positions facing each other on a rear surface thereof while interposing the axis of the spindle 3. The projections 31*a* are engaged with coupling holes 21*a* (see FIG. 2) which are formed at corresponding positions of the spindle-side carrier member 21 mentioned above. Thus, the projections 31*a* receive a rotation driving force from the spindle-side carrier member 21 and is rotated in synchronization with the spindle-side carrier member 21.

The input carrier 31 has a hole-shaped coupling section 31*b* at the center thereof, which is loosely engageable with a shaft-shaped coupling portion 3*a* of the spindle with a play angle $\alpha$ (see FIG. 5). The input carrier 31 also has arms 31*c* extending in the axial direction at both of two side positions thereof. The click spring 34 is caulked to be fixed by tips of the arms 31*c*. On both sides of each projection 31*a*, release guides holes 31*d* are formed for releasing the lock gears 35.

The center ring 32 has a hole-shaped coupling portion 32*a* at the center thereof, which is fixedly engageable with the shaft-shaped coupling portion 3*a* of the spindle with no play. The center ring 32 also has lock guide cam faces 32*b* at four positions on an outer circumferential surface thereof (at an interval of 60 degrees and 120 degrees). The lock guide cam faces 32*b* are respectively in contact with inner surfaces of the four lock gears 35. When the relative rotation direction between the center ring 32 and the lock gears 35 is changed, the lock guide cam faces 32*b* press the lock gears 35 toward the lock ring 33. The center ring 32 has receiving sections 32*c* (see FIG. 3) for receiving a steel ball 39 engageable with the click spring 34.

The lock gears 35 each have a sloping cam face 35*a* on an inner side thereof, which is slightly projected at the center so as to correspond to the lock guide cam face 32*b*. Each lock gear 35 has an outer circumferential gear 35*b* on an outer side thereof, which is engaged with the inner circumferential surface of the lock ring 33 when being pressed by the lock ring 33. Each lock gear 35 has a projecting pin 35*c* extending in the axial direction on a side wall thereof. The projecting pin 35*c* is loosely engageable with the release guides hole 31*d* of the input carrier and a fixing guide hole 37*c* of the carry plate described later.

Four lock gears 35 are provided in correspondence with the four lock guide cam faces 32*b* of the center ring. The sloping cam face 35*a* on the inner side thereof is sloping both rightward and leftward. Therefore, whether the relative rotation direction between the lock gears 35 and the center ring 32 is changed in a forward direction or n a reverse direction, the lock gears 35 are pressed toward the lock ring 33 and the rotation of the spindle 3 is locked by all the four lock gears 35.

The lock ring 33 is located at the outer periphery of the lock mechanism section 10C. The lock ring 33 has an inner circumferential gear 33*a* which is engaged with the outer circumferential gears 35*a* of the lock gears 35 when the lock gears 35 are pressed. The lock ring has three engageable pins 33*b*, on a side wall thereof, which extend in the axial direction to be fixedly engaged with a clutch housing 25 (see FIG. 2). By being fixedly engaged with the engageable pins 33*b*, the lock ring 33 acts as a rotational-fixed member. The lock ring 33 has a guide groove 33*e* on the other side wall thereof for guiding the O-ring 36 to a contact position.

The carry plate 37 has an engageable hole 37*a* at the center thereof, which is loosely engageable with the shaft-shaped coupling portion 3*a* of the spindle. On both sides of the engageable hole 37*a*, the carry plate 37 has insertion holes 37*b* through which the arms 31*c* are insertable. The carry plate 37 has the four fixing guide holes 37*c* at an interval of 60 degrees and 120 degrees. The fixing guide holes 37*c* are respectively loosely engageable with the projecting pins 35*c* of the four lock gears 35 in the radial direction. Between each two fixing guide holes 37*c* located at an interval of 60 degrees, a bearing portion 37*d* is formed for positioning a steel ball 38 which is provided between two lock gears 35 for supporting the side surfaces thereof.

The carry plate 37 has an engageable groove 37*e*, along an outer periphery on the side of the lock ring, for supporting the O-ring 36 through engagement therewith.

The O-ring 36 is engaged with, and supported by, the engageable groove 37*e* and thus contacts the side wall of the lock ring 33. Therefore, the O-ring 36 is inconstant contact with the side wall of the lock ring 33, more specifically, with the guide groove 33*e*.

The O-ring 36 is formed of an elastic rubber material and contacts the side wall of the lock ring 33 with a sliding resistance. The O-ring 36 is formed of a rubber material, and therefore constantly exerts an influence of the rotational-fixed state of the lock ring 33 on the carry plate 37 even at the time of rotation driving.

The click spring 34 acts to prevent an impact noise from being generated by the rotation of the spindle and elements related thereto caused by inertia while the motor M is at a stop, and thus to reduce the impact load imposed on the rotation output device 10. The click spring 34 has an engageable hole 34*a* at the center thereof, which is loosely engageable with the shaft-shaped coupling portion 3*a* of the spindle. The click spring 34 also has an elastically deformable portion 34*b* projecting in a brim shape at two positions along an outer periphery facing each other while interposing the axis of the spindle 3. The two elastically deformable portions 34*b* each have two steel ball stopping holes 34*c*, which are separated from each other by a distance approximately corresponding to the play angle α. Owing to this structure, the stainless ball 39 provided on the center ring 32 is stopped by one of the steel ball stopping holes 34*c* (see the click spring 34 represented with the dashed line in FIG. 4). The click spring 34 also has fixing holes 34*d* along the outer periphery thereof for caulking and fixing the tips of the arms 31*c* extending from the input carrier 31. The arms 31*c* are caulked and thus fixed by the fixing holes 34*d*, and thus the click spring 34 is rotated integrally with the input carrier 31.

Owing to such a structure of the click spring 34, the rotation of the center ring 32 which is integral with the spindle 3 and elements related thereto is limited by an urging force of the elastically deformable portions 34*b* of the click spring 34 rotating integrally with the input carrier 31.

Accordingly, when the spindle 3 and elements related thereto are rotated with an inertial force smaller than the urging force of the elastically deformable portions 34*b*, the spindle 3 and elements related thereto do not freely rotate and thus no impact noise is generated. When the spindle 3 and elements related thereto are rotated with an inertial force greater than the urging force of the elastically deformable portions 34*b*, the elastically deformable portions 34*b* are deformed and the spindle 3 and elements related thereto are rotated by the play angle α. However, while the steel ball 39 provided on the center ring 32 moves between the two steel ball stopping holes 34*c*, the elastically deformable portions 34*b* give the steel ball 39 a sliding resistance. Therefore, the rotation force of the spindle 3 and elements related thereto is reduced and the generation of the impact noise is alleviated.

The elastically deformable portions of the click spring 34 are deformed in the axial direction to reduce the rotation force. Therefore, the space required due to the deformation can be smaller than in the case where the deformation occurs in the radial direction. This makes the click spring compact.

The click spring also acts as a member for fixing the assembly of the entire lock mechanism section 10C, which can reduce the number of elements.

Figure 7:
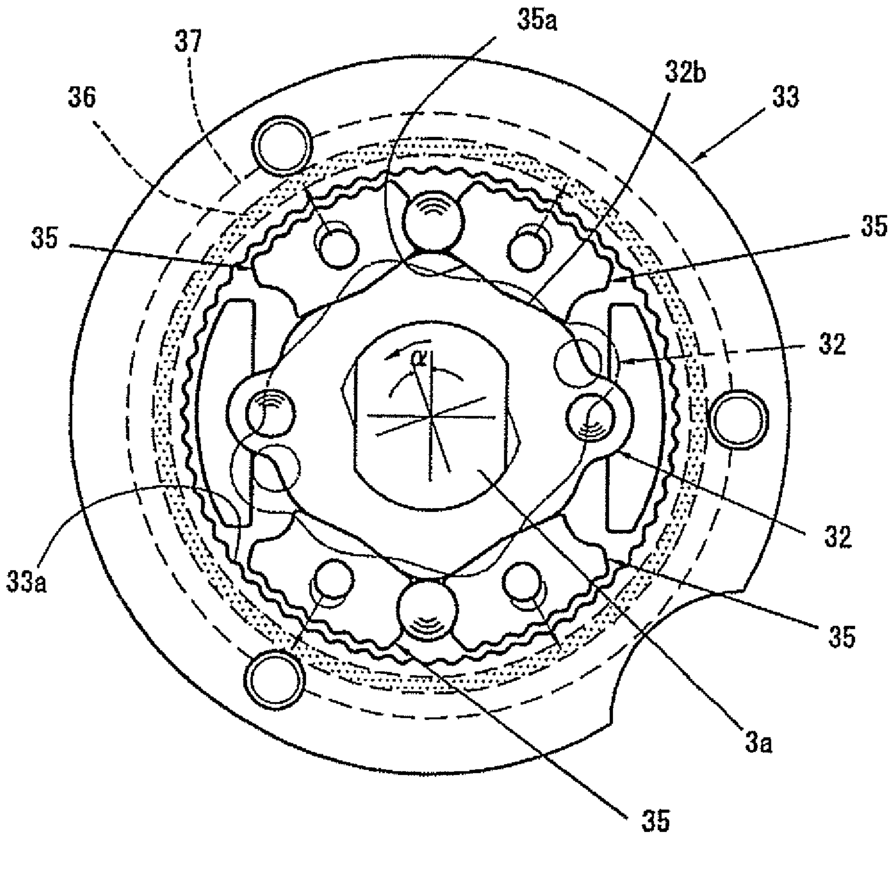
FIG. 7 is a front view of the lock mechanism section illustrating a locking function.
Figure 8:
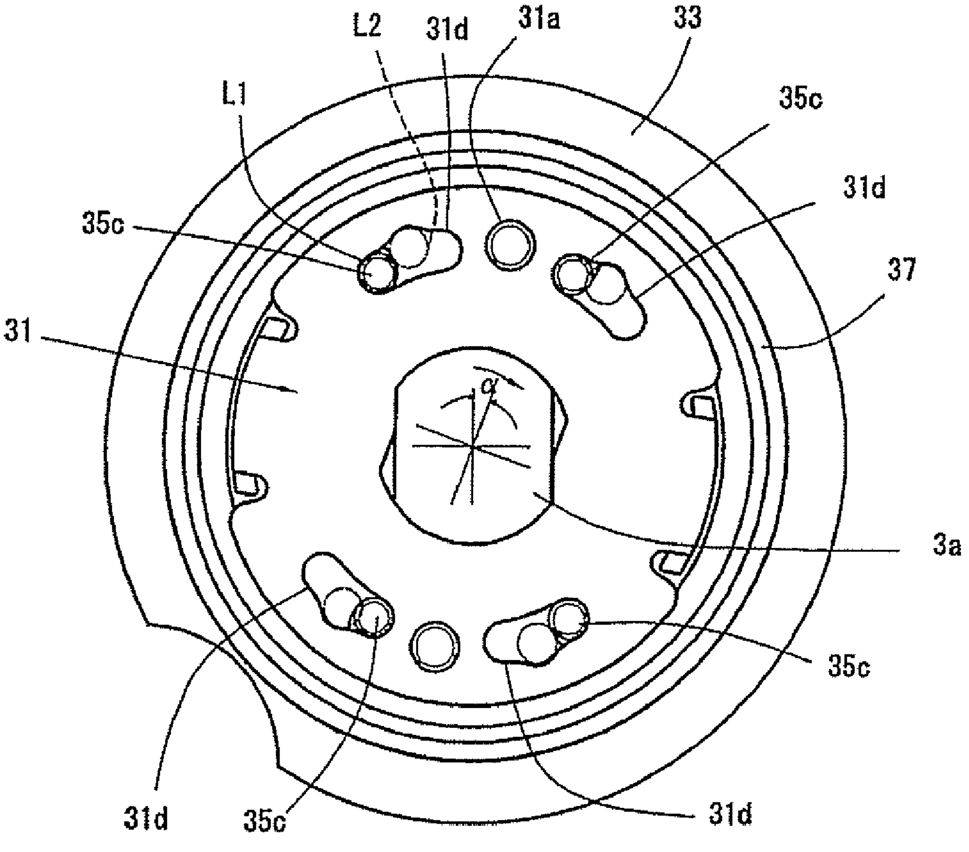
FIG. 8 is a rear view of the lock mechanism section illustrating the locking function.
Figure 9:
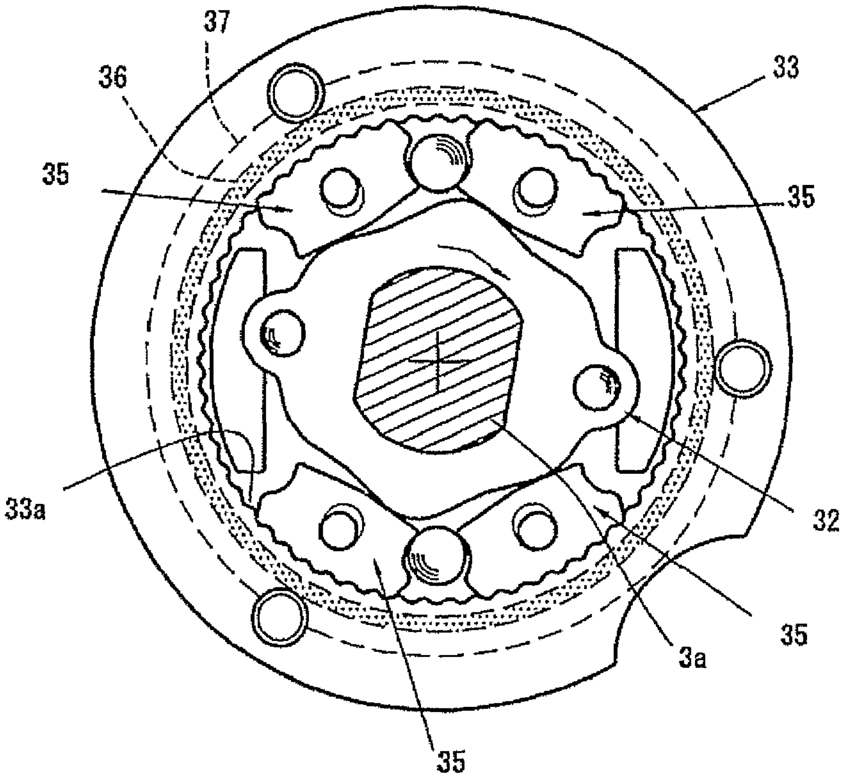
FIG. 9 is a front view of the lock mechanism section illustrating the locking function.
Figure 10:
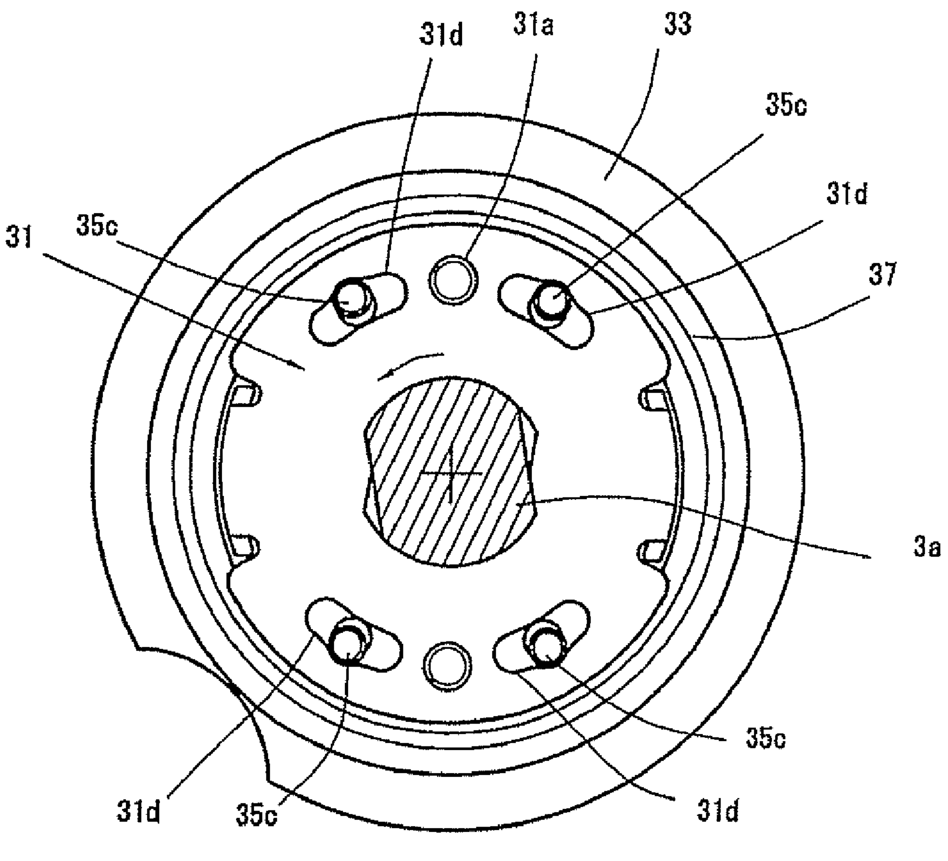
FIG. 10 is a rear view of the lock mechanism section illustrating the locking function.

The locking function of the lock mechanism section 10C having such a structure will be described with reference to FIG. 7 through FIG. 10 illustrating the function. FIG. 7 and FIG. 8 are respectively a front view and a rear view of the lock mechanism section 10C when the spindle 3 is rotated in a direction with the play angle, i.e., in a forward rotation direction. FIG. 9 and FIG. 10 are respectively a front view and a rear view of the lock mechanism section 10C when the spindle 3 is rotated in a direction with no play angle, i.e., in a reverse rotation direction.

As shown in FIG. 7, the center ring 32 is fixedly engaged with the shaft-shaped coupling portion 3*a* of the spindle and thus is rotated integrally with the spindle 3. The four lock gears 35 respectively put the sloping cam faces 35*a* into contact with the lock guide cam faces 32*b* of the center ring 32. The lock ring 33 located at the outermost position is fixed to the clutch casing (not shown in FIG. 7) and therefore is constantly fixed.

The state represented with the solid line in FIG. 7 is a normal state, i.e., a state where the locking function is not provided. In this state, the center ring 32 and the four lock gears 35 are freely rotatable concomitantly with the spindle 3 by the rotation driving force of the motor M.

Next, a locked state will be described.

First, the locking function when the relevant elements are rotated in the forward direction will be described. After the motor is stopped, the operator rotates the spindle 3 in the direction of the arrow (the forward rotation direction). Then, as represented with the one-dot chain line, the center ring 32 is pivoted by the play angle α. When the center ring 32 is pivoted in this manner, the four lock gears 35 are pressed toward the lock ring 33 by the lock guide cam faces 32*b* (represented with the arrow). When the lock gears 35 are pressed in this manner, the outer circumferential gears 35*b* of the lock gears 35 are engaged with the inner circumferential gear 33*a* of the lock ring, and thus the motion of the lock gears

35 in the rotation direction is locked. By the lock gears 35 being locked, the center ring 32 is also locked.

As also shown in FIG. 8, the input carrier 31 is not rotated in the locked state. Therefore, the projecting pins 35*c* extending from the lock gears 35 are moved to a locked position L2 from a normal position L1.

In other words, when the spindle 3 is rotated in the forward direction, the center ring 32 is pivoted and the four lock gears 35 and the carry plate 37 supporting the four lock gears 35 are also pivoted by the influence of the center ring 32. The other elements, i.e., the input carrier 31 and the click spring 34 are fixed at this point. Therefore, the relative rotation direction between the center ring 32 and the lock gears 35 is changed. Thus, the lock mechanism section 10C acts as intended.

By the center ring 32 being locked, the spindle 3 is locked. As a result, the attachment/detachment operation of the chuck 4 and the manual operation of the electric tool can be easily performed.

Next, the locking function when the relevant elements are rotated in the reverse direction will be described. As shown in FIG. 9 and FIG. 10, after the motor is stopped, the operator rotates the spindle 3 in the direction of the arrow (the reverse rotation direction). Then, the center ring 32 is also pivoted in the reverse rotation direction. Since there is no play angle α in the reverse rotation direction, the input carrier 31 and the click spring 34 are also rotated, unlike the case of the forward rotation direction.

Without the carry plate 37, the lock gears 35 would concomitantly rotate with the other elements and the locking function would not be provided.

However, in this embodiment, the carry plate 37 is influenced by the fixed state of the lock ring 33 and retains the positions of the lock gears 35 in the rotation direction. Therefore, the lock gears 35 are not concomitantly rotated with the other elements and retain the positions thereof in the rotation direction. As a result, the relative rotation direction of the lock gears 35 is changed with respect to the center ring 32.

Owing to such a change in the relative rotation direction, as shown in FIG. 9, the lock gears 35 are pressed toward the lock ring 33 by the lock guide cam faces 32*b*, and the outer circumferential gears 35*b* of the lock gears are engaged with the inner circumferential gear 33*a* of the lock ring. Thus, the motion of the lock gears 35 in the rotation direction is locked.

By the lock gears 35 being locked in this manner, the center ring 32 is also locked. Thus, the lock mechanism section 10C acts as intended.

In other words, since the carry plate 37 retains the positions of the lock gears 35 in the rotation direction, the lock gears 35 can be locked even in response to the rotation in the reverse direction with no play angle.

For releasing these elements from the locked state, a rotation driving force from the motor M is input to the lock mechanism section 10C. In the locked state, when the rotation driving force from the motor M is input to the input carrier 31 as described above, only the input carrier 31 is rotated among the elements of the lock mechanism section 10C. Then, as shown in FIG. 8, the projecting pins 35*c* of the lock gears 35 are guided from the locked position L2 to the normal release position L1 by the release guides holes 31*d* formed in the input carrier 31. By the projecting pins 35*c* of the lock gears 35 being guided to the release position, the lock gears 35 and the lock ring 33 are disengaged from each other, and the relevant elements are released from the locked state.

Since the release from the locked state is automatically conducted by the rotation driving force of the motor M, the usual output of the rotation driving force from the motor M is resumed easily. Thus, the normal operation using the electric tool can be performed.

Figure 11:
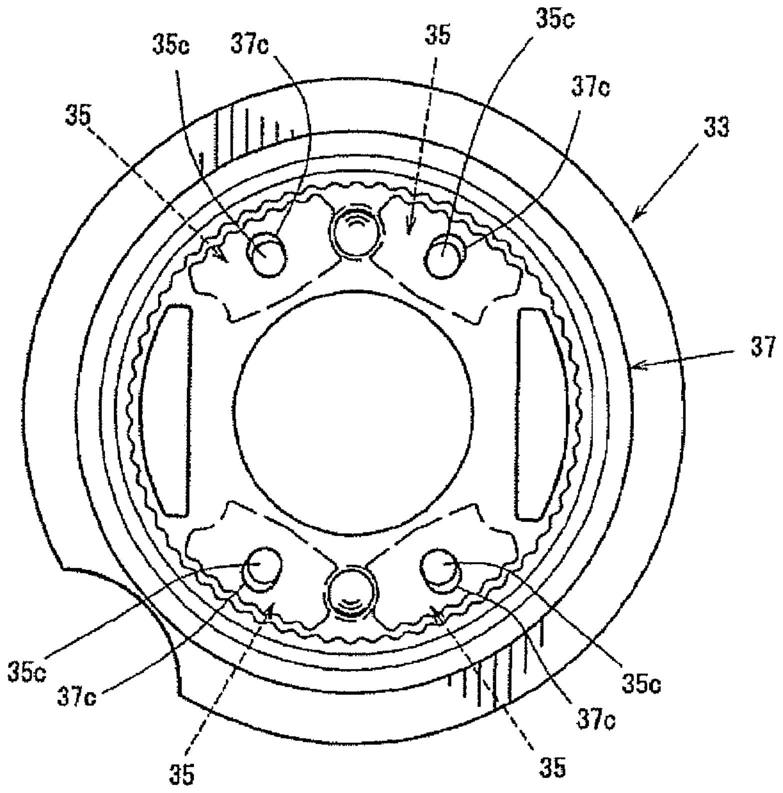
FIG. 11 is a rear view of the lock mechanism section without an input carrier.

Next, the carry plate will be described in detail with reference to FIG. 6 and FIG. 11. FIG. 11 is a rear view of the lock mechanism section 10C without the input carrier 31.

The carry plate 37 has the four fixing guide holes 37*c* respectively loosely engageable with the projecting pins 35*c* of the four lock gears 35 as described above. Owing to this, the carry plate 37 is integrally rotatable with the lock gears 35. The carry plate 37 has the engageable groove 37*e* for supporting the O-ring 36 along the outer periphery through engagement therewith, so that the outer periphery is in contact with the lock ring 33 via the O-ring 36. The carry plate 37 is also structured to give the lock ring 33 a slight urging force such that the carry plate 37 contacts the lock ring 33 with a certain degree of pressure.

Owing to such a structure, the lock gears 35 are always influenced by the rotational fixation of the lock ring 33 via the carry plate 37. Especially because one carry plate 37 defines the positions of the four lock gears 35, the rotational fixation can influence all the four lock gears 35. In addition, the one carry plate 37 can maintain the rotational phase of the four lock gears 35.

The provision of the carry plate 37 allows the lock gears 35 to be influenced by the rotational fixation of the lock ring 33 as described above. Therefore, even when the operator pivots the spindle 3 in the reverse rotation direction with no play angle after the motor M is stopped, the relative rotation direction between the lock gears 35 and the center ring 32 is changed with certainty.

In this embodiment, the O-ring 36 is provided on the carry plate 37 to increase the sliding resistance and thus to put the O-ring 36 in contact with the lock ring. In another embodiment, an outer edge of the carry plate 37 can be put into direct contact with the lock ring.

In this embodiment, the O-ring is constantly in contact with the lock ring. Alternatively, the O-ring is designed to be separated from the lock ring when the rotation speed of the spindle becomes sufficiently high, so that the O-ring 36 is protected against deterioration.

Next, the function and effect of the rotation output device 10 including the lock mechanism section 10C having such a structure will be described.

The rotation output device in this embodiment has the following structure. The rotation output device includes an output conveyance mechanism including an input carrier 31 for outputting a rotation driving force of the motor and the center ring 32 for outputting a rotation driving force in response to the driving of the input carrier 31, which are coaxially connected to each other so as to convey the rotation driving force, with a predetermined play angle α to which the rotation force is not conveyed being formed in a relative rotation direction. The rotation output device also includes a lock mechanism section 10C including a lock gear 35 for locking a rotation conveyed from the center ring 32 by being pressed toward a lock ring 33 by the center ring 32, wherein the center ring 32 and the lock ring 33 located on an outer circumferential surface of the center ring 32 and rotational-fixed are provided to face each other while being separated by a predetermined distance in a radial direction; a lock guide cam face 32*b* operable to press the lock gear 35 toward the lock ring 33 by the rotation conveyed from the center ring 32; and a release guide hole 31*d* capable of releasing the pressed state of the lock gear 35 by the rotation conveyed from the input carrier 31 and thus capable of releasing the locked state. A carry plate 37 is provided, between the lock gear 35 and the lock ring 33, for retaining the position of the lock gear 35 in the rotation direction when receiving the rotation from the center ring 32.

Namely, the carry plate 37, for retaining the position of the lock gear 35 in the rotation direction when receiving the rotation from the center ring 32, is provided between the lock gear 35 and the lock ring 33. Thus, the lock ring 33 which is rotational-fixed is used as a member for preventing a concomitant rotation of the lock gear 35.

According to the above-described structure, the lock ring 33 which is rotational-fixed is used as a member for preventing a concomitant rotation of the lock gear 35. Therefore, the position of the lock gear 35 in the rotation direction is constantly retained under the influence of the fixed state of the lock ring 33 by the carry plate 37. Namely, the position of the lock gear 35 in the rotation direction is retained with certainty regardless of the pivoting direction of the spindle.

Since the position of the lock gear 35 in the rotation direction is constantly retained by the carry plate 37, the lock gear 35 is prevented from being concomitantly rotated with the spindle 3 even when the operator pivots the spindle 3. Thus, the rotation output device for realizing a locking function with certainty can be provided.

In this embodiment, the carry plate 37 is formed of a contact member rotatable integrally with the lock gear 35 and having an outer periphery contacting the lock ring 33.

Namely, the carry plate 37 integrally rotatable with the lock gear 35 is provided on the side of the lock gear 35, among the lock gear 35 and the lock ring 33.

According to the above-described structure, the relative rotation direction between the carry plate 37 and the lock gear 35 is not changed at the time of rotation driving. Rather, the relative rotation direction between the carry plate 37 and the lock ring 33 is changed. By causing the relative rotation direction between the carry plate 37 and the lock ring 33 to be changed, the undesirable possibility that the routine operations for locking or releasing the lock gear 35 are disturbed by the influence of such a change with respect to the carry plate 37 can be eliminated.

In this embodiment, a plurality of lock gears 35 are provided, and the plurality of lock gears 35 are integrally rotatable with one another by one carry plate 37. Namely, the plurality of lock gears 35 are structured to be integrally rotatable with one another by one carry plate 37.

According to the above-described structure, the lock torque can be increased by providing a plurality of lock gears 35. Since the plurality of lock gears 35 are integrally rotatable with one another by one carry plate 37, the positions of the plurality of lock gears 35 in the rotation direction are retained in the state of being matched with one another.

In this embodiment, the O-ring 36 for increasing a sliding resistance is provided at a position where the carry plat 37 contacts the lock ring 33.

According to the above-described structure, the carry plate 37 contacts the lock ring 33 while having a high sliding resistance. Therefore, the carry plate 37 is easily influenced by the rotational-fixed state of the lock ring 33. As a result, the position of the carry plate 37 in the rotation direction is retained with higher certainty, and the carry plate 37 retains the position of the lock gear 35 in the rotation direction with higher certainty.

In this embodiment, the O-ring 36 is formed of an elastic member.

According to the above-described structure, the O-ring is formed of an elastic rubber member. Therefore, the carry plate 37 can be in constant contact with the lock ring 33. Namely, since the offset of the relative positions of the carry plate 37 and the lock ring 33 in the axial direction is absorbed by the elasticity of rubber, the carry plate 37 can be in constant contact with the lock ring 33.

As a result, the carry plate 37 can retain the position of the lock gear 35 in the rotation direction with higher certainty.

In this embodiment, the rotation output device 10 is included in an output system of an electric tool. The rotation output device 10 in this embodiment is also applicable to other apparatuses requiring a rotation output.

In another embodiment, a member extending from the lock ring 33 to the side surfaces of the lock gears 35 may be provided so as to exert an influence of rotational fixation on the lock gears 35, as long as the member is capable of retaining the positions of the lock gears 35 in the rotation direction while the motor is at a stop.

The elements of the present invention and the elements in the above-described embodiment correspond as follows.

The rotation driving member of the present invention corresponds to the input carrier 31 in the embodiment;

the rotation output member corresponds to the center ring 32;

the fixing member corresponds to the lock ring 33;

the movable lock member corresponds to the lock gear 35;

the lock operation member corresponds to the lock guide cam face 32*b;* the release member corresponds to the release guide hole 31*d*; and the retaining means corresponds to the carry plate 37.

However, the present invention is not limited to the above-described embodiment.

The invention claimed is:

1. A rotation output device, comprising:

an output conveyance mechanism including a rotation driving member for outputting a rotation driving force and a rotation output member for outputting a rotation force in response to the driving of the rotation driving member, wherein the rotation driving member and the rotation output member are coaxially connected to each other so as to convey the rotation force, and wherein the rotation force is conveyed with a predetermined play angle such that the rotation force is not conveyed in a relative rotation direction within the predetermined play angle;

a lock mechanism including a fixing member with teeth, wherein the fixing member is located on an outer circumferential surface of the rotation output member, a movable lock member with teeth and projecting pins for locking a rotation conveyed from the rotation output member when the movable lock member enters into a pressed state by being pressed toward the fixing member by the rotation output member, wherein the rotation output member and the fixing member are provided to face each other and, in an unlocked state, are provided to be separated by a predetermined distance in a radial direction;

a lock operation member operable to press the movable lock member toward the fixing member by the rotation conveyed from the rotation output member to enter a locked state;

a release member capable of releasing the pressed state of the movable lock member by the rotation conveyed from the rotation driving member and thus capable of releasing the locked state; and retaining means provided between the movable lock member and the fixing member and including guide holes engageable with the projecting pins, wherein the retaining means are operable to retain the position of the movable lock member in the rotation direction when receiving the rotation from the rotation output member.

2. A rotation output device according to claim 1, wherein the retaining means is formed of a contact member integrally rotatable with the movable lock member and partially contacting the fixing member.

3. A rotation output device according to claim 2, wherein a plurality of the movable lock members are provided, and the plurality of movable lock members are integrally rotatable with one another by one contact member.

4. A rotation output device according to claim 2, wherein sliding resistance increasing means for increasing a sliding resistance is provided at a position where the contact member contacts the fixing member.

5. A rotation output device according to claim 4, wherein the sliding resistance increasing means is formed of an elastic member.

6. An electric tool including a rotation output device according to claim 1 in an output system.

* * * * *